UNITED STATES PATENT OFFICE 2,619,440

GRAMOPHONE RECORD

William Edward Lord, Harlington, England, assignor to Electric & Musical Industries Limited, Hayes, England, a company of Great Britain No Drawing. Application March 13, 1947, Serial No. 734,552. In Great Britain February 5, 1946

Section 1, Public Law 690, August 8, 1946
Patent expires February 5, 1966

3 Claims. (Cl. 154—43)

This invention relates to gramophone records.

For various reasons it is sometimes desired to manufacture gramophone records of a laminated construction and usually such records have comprised a thermoplastic core with shellac-coated paper layers carrying a suitable surface composition. One defect in such records is the development in the course of time of an orange-peel pattern on the record surface due to the texture of the underlying paper. Other defects are also noticeable which are attributable largely to the dimensional instability of the paper layer between the thermoplastic core and the surface composition, especially under conditions of varying humidity. Furthermore, during pressing of the record the paper layers are liable to split.

The object of the present invention is to provide an improved gramophone record with a view to obviating or reducing these defects.

According to the invention a pressed gramophone record is provided comprising a thermoplastic base or core and a disc or discs of metal foil carrying the surface composition in which the record grooves are formed. Preferably, aluminium foil is employed.

In carrying the invention into effect according to one example, the record comprises a core of thermoplastic material of any suitable composition and two laminations in the form of discs of aluminium foil of a thickness of about two to three thousandths of an inch, the surface composition of the record being provided on the surfaces of the aluminium discs so as to form a double-sided record. In manufacturing the record the aluminium discs may be coated on each side with a suitable adhesive and the surface composition, which may comprise a conventional mixture comprising slate powder filler, shellac and a small amount of carbon black, may be dusted on to one side of each aluminium disc which is then heated so as to soften the particles of the surface composition, the discs being then lightly rolled to consolidate the surface composition. The record is then pressed in a conventional record press with the core material interposed between the discs of aluminium foil. The core material may if desired be pre-heated before being interposed between the discs of foil. The core material is of sufficient thickness so that under suitable conditions of heat and pressure the core material is caused to flow between the discs of foil and sound grooves are formed in the surface composition on the discs of foil forming a typical gramophone record.

In some cases it may be found that the core material does not adhere adequately to the discs of foil and accordingly there may be interposed between the discs of foil and the core material, paper layers. The paper layers may be coated on one side with a suitable adhesive, the coated side being arranged adjacent the foil discs, it being found that the thermoplastic core material readily bonds to the paper layers without adhesive whilst the paper layers carrying adhesive also readily bond to the aluminium foil. In this example the provision of a coating of adhesive on the side of each aluminium disc facing the core material may be omitted. If desired, in order to improve adhesion between the discs of foil and the surface composition and the core material, the discs of foil may be slightly roughened, the extent of roughening being such as would be obtained in the case of aluminium foil by anodising or, in the case of other foils, such as copper foils, by etching. Also, if desired, the surface of the foil adjacent the core material may be provided with an adhering layer of tissue paper about 0.0005″ in thickness. This layer of tissue paper can conveniently be secured by an adhesive such as a casein adhesive to the foil prior to the foil being cut into discs of appropriate size for use in the records.

In the specification of co-pending British patent application No. 3,554/46 it is suggested to employ a surface composition having a large proportion (7% to 50%) of carbon black. It is found that a composition comprising a large percentage of carbon black cannot readily be moulded as a mass, that is to say, it should be in the form of a relatively thin layer prior to pressing and, accordingly, the present invention is especially applicable for use with record surface compositions containing a large percentage of carbon black, the surface composition being spread over the discs of foil prior to pressing the record.

In one specific example of the invention the surface composition comprises:

| | Per cent |
|---|---|
| Alvar (registered trade-mark) resin grade 7–70 (polyvinyl acetal resin) | 52.3 |
| Carbon black | 43.62 |
| Calcium stearate | .58 |
| Carnauba wax | .87 |
| Seekay Wax R.93C made by I. C. I. Ltd. (chlorinated napthalene) | 2.63 |

The resin employed in the above composition may be replaced by ethyl cellulose, polyvinyl chloride, the copolymer of vinyl chloride, and vinyl acetate, cellulose acetate, polyvinyl formval, polyethylene or other suitable thermoplastics. Shellac can also be employed but in this case the percentage of carbon black should not exceed 30%.

In place of carbon black any other amorphous carbon obtained from the combustion of gaseous solid or liquid hydrocarbons may be used such as lamp black, vegetable black or acetylene black. The surface composition may, if desired, comprise one having a conventional abrasive, such as slate powder or rotten stone.

A suitable adhesive for use in coating the aluminium foil may be as follows:

| | Per cent |
|---|---|
| Nitrocellulose HX.45 (made by I. C. I. Ltd.) 30 per cent alcohol damping | 6.00 |
| Alvar (registered trade-mark) resin grade 7–70 | 14.00 |
| Arochlor 1262 (made by Monsanto Ltd.) (chlorinated diphenyl) | 14.00 |
| Acetone | 66.00 |

Instead of using the above-mentioned adhesive, any other suitable adhesive may be employed. For example, the foil discs may be coated with a solution of shellac to which an accelerator may be added, the coating being precured by heating prior to the pressing operation so as to avoid too much softening of the coating during pressing of the record.

The raw materials comprising the surface composition may first be mixed together in powdered form and then loaded onto roller mixers heated at about 250°–300° F., the mass being worked for about ten minutes to render it plastic before calendering into thin sheets approximately 0.04" thick. The calendered sheets may then be broken up and finally ground as finely as possible so as to pass a 200 (I. M. M.) sieve, employing any conventional method, e. g., ball milling or grinding in a ring roll mill. The ground composition is then applied to the foil discs as above described.

Although in most cases the invention will be applied to double-sided records it will be appreciated that the invention is equally applicable to single-sided records in which case only a single disc of foil need be employed although in most cases at least two discs of foil will be required if it is found that the use of a single disc of foil produces a record which is liable to warp after pressing both discs having said surface composition but only one disc having record grooves.

I claim:

1. A gramophone record comprising a base of thermoplastic material and of sufficient thickness to flow upon the application of heat and pressure and a disk of yieldable metal foil bonded to said base, said foil being surfaced with a composition capable of having sound grooves impressed therein.

2. A record according to claim 1 in which said foil is aluminum having a thickness of about 0.002 to 0.003 inch.

3. A gramophone record comprising a thermoplastic core of sufficient thickness to flow upon the application of heat and pressure, a disk of yieldable metal foil positioned on each side of said core, and a layer of paper interposed between and bonded to each disk and to the said core, the said disks being surfaced with a composition for receiving the impression of record grooves.

WILLIAM EDWARD LORD.

REFERENCES CITED

The following references are of record in the file of this patent:

UNITED STATES PATENTS

| Number | Name | Date |
|---|---|---|
| 1,416,342 | Emerson | May 16, 1922 |
| 2,000,527 | Linderman | May 7, 1935 |
| 2,050,248 | Eisen | Aug. 11, 1936 |
| 2,138,419 | Gavin | Nov. 29, 1938 |
| 2,149,732 | Groff | Mar. 7, 1939 |
| 2,206,636 | Hunter | July 2, 1940 |
| 2,269,267 | Hunter | Jan. 6, 1942 |
| 2,307,091 | Yngve | Jan. 5, 1943 |
| 2,335,986 | Yngve | Dec. 7, 1943 |